(12) United States Patent
Smith

(10) Patent No.: US 7,893,875 B1
(45) Date of Patent: Feb. 22, 2011

(54) DEVICE FOR AND METHOD OF GEOLOCATION

(75) Inventor: David C. Smith, Columbia, MD (US)

(73) Assignee: The United States of America as represented by the Director National Security Agency, Washington, DC (US)

( * ) Notice: Subject to any disclaimer, the term of this patent is extended or adjusted under 35 U.S.C. 154(b) by 185 days.

(21) Appl. No.: 12/381,411

(22) Filed: Mar. 11, 2009

Related U.S. Application Data

(63) Continuation-in-part of application No. 12/290,892, filed on Oct. 31, 2008, now abandoned.

(51) Int. Cl.
*G01S 3/02* (2006.01)
(52) U.S. Cl. ...................................... 342/464
(58) Field of Classification Search .................. 342/464
See application file for complete search history.

(56) References Cited

U.S. PATENT DOCUMENTS

| | | | |
|---|---|---|---|
| 5,008,679 A * | 4/1991 | Effland et al. ............... | 342/353 |
| 5,500,648 A | 3/1996 | Maine et al. | |
| 5,526,001 A | 6/1996 | Rose et al. | |
| 5,570,099 A * | 10/1996 | DesJardins .................. | 342/378 |
| 5,844,521 A | 12/1998 | Stephens et al. | |
| 6,018,312 A * | 1/2000 | Haworth ..................... | 342/353 |
| 6,020,847 A | 2/2000 | Upton et al. | |
| 6,184,831 B1 * | 2/2001 | Dalby et al. ................. | 342/465 |
| 6,285,319 B1 | 9/2001 | Rose | |
| 6,292,665 B1 | 9/2001 | Hildebrand et al. | |
| 6,754,502 B2 | 6/2004 | Hildebrand et al. | |
| 6,933,888 B1 | 8/2005 | Schiffmiller et al. | |
| 6,934,626 B2 | 8/2005 | Tingley | |
| 7,019,692 B2 * | 3/2006 | Baugh et al. ................. | 342/378 |
| 7,132,961 B2 | 11/2006 | Yannone et al. | |
| 7,187,326 B2 | 3/2007 | Beadle et al. | |
| 7,268,728 B1 | 9/2007 | Struckman | |
| 7,286,085 B2 | 10/2007 | Kolanek et al. | |
| 7,315,280 B2 | 1/2008 | Schiffmiller et al. | |
| 7,391,355 B2 | 6/2008 | Mortimer | |
| 7,436,355 B2 | 10/2008 | Nicholson et al. | |
| 2005/0184907 A1 * | 8/2005 | Hall et al. .................... | 342/387 |
| 2005/0231425 A1 | 10/2005 | Coleman et al. | |

(Continued)

OTHER PUBLICATIONS

Stein, S.; Algorithms for Ambiguity Function Processing; IEEE Transactions on Acoustics, Speech, and Signal Processing; Jun. 1981; pp. 588-599; vol. ASSP-29, No. 3.

(Continued)

*Primary Examiner*—Thomas H Tarcza
*Assistant Examiner*—Frank McGue
(74) *Attorney, Agent, or Firm*—Robert D. Morelli

(57) ABSTRACT

A device and method of geolocating a transmitter. First and second receivers, in motion, receive a signal from the transmitter. Digitizers in the receivers digitize the signal. Converters in the receivers for converting the digitized signals to complex-valued signals. Transmitters on the receivers transmit their digitized signals, locations, and velocities at the time the signal was received to a processor. A central processing unit on the processor determines a difference in radial velocities of the receivers relative to the transmitter. The difference in radial velocities and delay time between the signals received at the receivers are used to geolocate the transmitter.

19 Claims, 2 Drawing Sheets

U.S. PATENT DOCUMENTS

| | | |
|---|---|---|
| 2006/0030332 A1 | 2/2006 | Carrott et al. |
| 2007/0127012 A1 | 6/2007 | Kornblum |
| 2007/0129085 A1 | 6/2007 | Kennedy Jr. |
| 2007/0146203 A1 | 6/2007 | Chung et al. |
| 2007/0236389 A1 | 10/2007 | Lommen et al. |
| 2008/0151231 A1 | 6/2008 | Peterson, Jr. |
| 2008/0169978 A1 | 7/2008 | Powell et al. |
| 2008/0174490 A1 | 7/2008 | Ray et al. |
| 2008/0186235 A1 * | 8/2008 | Struckman et al. .......... 342/465 |
| 2008/0252516 A1 | 10/2008 | Ho et al. |
| 2008/0252525 A1 | 10/2008 | Ho et al. |

OTHER PUBLICATIONS

Chan, Y. et al.; Joint Time-Scale and TDOA Estimation: Analysis and Fast Approximation; IEEE Transactions on Signal Processing; Aug. 2005; pp. 2625-2634; vol. 53, No. 8.

* cited by examiner

DEVICE FOR AND METHOD OF GEOLOCATION

CROSS REFERENCE TO RELATED APPLICATION

This is a continuation-in-part application of U.S. patent application Ser. No. 12/290,892, filed Oct. 31, 2008 now abandoned.

FIELD OF INVENTION

The present invention relates, in general, to data processing concerning location and, in particular, to determining position.

BACKGROUND OF THE INVENTION

In an article entitled "Algorithms for Ambiguity Function Processing," published in the *IEEE Transactions Acoustics, Speech, and Signal Processing*, Vol. ASSP-29, No. 3, June 1981, Seymour Stein disclosed a method for calculating a complex ambiguity function (CAF) for narrow-band signals. Dr. Stein's method is not effective for processing wide-band signals.

In an article entitled "Joint Time-Scale and TDOA Estimation: Analysis and Fast Approximation," published in the IEEE Transactions on Signal Processing, Vol. 53, No. 8, August 2005, Y. T. Chan and K. C. Ho disclosed an iterative method to maximize a CAF, which the authors renamed as a cross-ambiguity function, for wide-band and real-valued signals. Chan et al. employ time-scaling and time-difference-of-arrival (TDOA) in their method. Chan et al. improve upon Dr. Stein's method by disclosing a method that is capable of processing a wide-band signal. However, the method of Chan et al. exhibits precision problems at low signal-to-noise ratios (SNR) as the signal length becomes large. In addition, the method of Chan et al. does not process complex-valued signals.

There is a need for a method for processing wide-band signals of large length without losing precision and a method for processing wide-band complex valued signals. The present invention is such a method.

U.S. Pat. No. 5,500,648, entitled "GEOLOCATION RESPONSIVE RADIO TELECOMMUNICATION SYSTEM AND METHOD THEREFOR," discloses a system where a subscriber unit communicates with a single satellite that uses a Doppler component, propagation duration, and real-time measurement signals to determine the geolocation of the subscriber unit. U.S. Pat. No. 5,500,648 is hereby incorporated by reference into the specification of the present invention.

U.S. Pat. No. 5,526,001, entitled "PRECISE BEARINGS ONLY GEOLOCATION IN SYSTEMS WITH LARGE MEASUREMENTS BIAS ERRORS," discloses a method that uses bearing rate of change to estimate emitter geolocation. U.S. Pat. No. 5,526,001 is hereby incorporated by reference into the specification of the present invention.

U.S. Pat. Nos. 5,844,521 and 6,020,847, each entitled "GEOLOCATION METHOD AND APPARATUS FOR SATELLITE BASED TELECOMMUNICATIONS SYSTEM," disclose devices for and methods of geolocating a mobile terminal by obtaining synchronization differential data to calculate least first and second geoposition lines. U.S. Pat. Nos. 5,844,521 and 6,020,847 are hereby incorporated by reference into the specification of the present invention.

U.S. Pat. No. 6,285,319, entitled "METHOD FOR REDUCING GEOMETRICAL DILUTION OF PRECISION IN GEOLOCATION OF EMITTERS USING PHASE CIRCLES," discloses a method of geolocating an emitter using at least one observer measuring signal change while moving on at least two observation tracks. U.S. Pat. No. 6,285,319 is hereby incorporated by reference into the specification of the present invention.

U.S. Pat. Nos. 6,292,665 and 6,754,502, entitled "GEOLOCATION OF CELLULAR PHONE USING SUPERVISORY AUDIO TONE TRANSMITTED FROM SINGLE BASE STATION," disclose methods of geolocation using angle of arrival and range information. U.S. Pat. Nos. 6,292,665 and 6,754,502 are hereby incorporated by reference into the specification of the present invention.

U.S. Pat. No. 6,933,888, entitled "MULTI-SHIP COHERENT GEOLOCATION SYSTEM," discloses a method of geolocating an emitter without requiring more than one platform to measure the same pulse from the emitter. U.S. Pat. No. 6,933,888 is hereby incorporated by reference into the specification of the present invention.

U.S. Pat. No. 6,934,626, entitled "LOW-COST, LOW-POWER GEOLOCATION SYSTEM," discloses a device for and method of geolocation by processing the magnitude of the transmitted signal. U.S. Pat. No. 6,934,626 is hereby incorporated by reference into the specification of the present invention.

U.S. Pat. No. 7,132,961, entitled "PASSIVE RF, SINGLE FIGHTER AIRCRAFT MULTIFUNCTION APERTURE SENSOR, AIR TO AIR GEOLOCATION," discloses a method of geolocation that uses batch-based recursive estimators. U.S. Pat. No. 7,132,961 is hereby incorporated by reference into the specification of the present invention.

U.S. Pat. No. 7,187,326, entitled "SYSTEM AND METHOD FOR CUMULANT-BASED GEOLOCATION OF COOPERATIVE AND NON-COOPERATIVE RF TRANSMITTERS," discloses a device for and method of geolocation that uses a transmitted signal's higher order statistics of temporally dependent waveforms. U.S. Pat. No. 7,187,326 is hereby incorporated by reference into the specification of the present invention.

U.S. Pat. No. 7,268,728, entitled "MOVING TRANSMITTER CORRELATION INTERFEROMETER GEOLOCATION," discloses a device for and method of geolocation that using direction-finding (DF) equipment. U.S. Pat. No. 7,268,728 is hereby incorporated by reference into the specification of the present invention.

U.S. Pat. No. 7,286,085, entitled "PRECISION GEOLOCATION SYSTEM AND METHOD USING A LONG BASELINE INTERFEROMETER ANTENNA SYSTEM," discloses a device for and method of geolocation that uses a long baseline interferometer antenna system. U.S. Pat. No. 7,286,085 is hereby incorporated by reference into the specification of the present invention.

U.S. Pat. No. 7,315,280, entitled "COHERENT GEOLOCATION SYSTEM," discloses a device for and method of geolocation that estimates the underlying repetition interval of the emitter. U.S. Pat. No. 7,315,280 is hereby incorporated by reference into the specification of the present invention.

U.S. Pat. No. 7,391,355, entitled "SINGLE PLATFORM GEOLOCATION METHOD AND APPARATUS," discloses a device for and method of geolocation that uses a single platform for determining a Doppler measurement set of a targeted aircraft or signal of interest. U.S. Pat. No. 7,391,355 is hereby incorporated by reference into the specification of the present invention.

U.S. Pat. No. 7,436,355, entitled "METHOD AND APPARATUS FOR GEOLOCATION DETERMINATION," discloses a device for and method of geolocation that determines an approximate location of a receiver, a range difference between the receiver and the satellite, a median value of the range difference, and an offset value between the range difference and the median value. U.S. Pat. No. 7,436,355 is hereby incorporated by reference into the specification of the present invention.

U.S. Pat. Appl. No. 20050231425, entitled "WIRELESS WIDE AREA NETWORKED PRECISION GEOLOCATION," discloses a device for and method of geolocation that uses a network of multitracking devices and a data link between the same to share information. U.S. Pat. Appl. No. 20050231425 is hereby incorporated by reference into the specification of the present invention.

U.S. Pat. Appl. No. 20060030332, entitled "METHOD AND SYSTEM FOR GEOLOCATION OF WIRELESS TRANSMISSIONS USING DISTRIBUTED PROCESSORS IN WIRELESS RECEIVER TOWERS AND A METHOD FOR COLLECTING A FEE FOR PROCESSING GEOLOCATION REQUESTS," discloses a device for and method of geolocation that uses multiple cell towers. U.S. Pat. Appl. No. 20060030332 is hereby incorporated by reference into the specification of the present invention.

U.S. Pat. Appl. No. 200701270.12, entitled "RATE-BASED RANGE AND GEOLOCATION," discloses a device for and method of geolocation that determines the speed and direction of the platform, a line from the platform, an angle between the travel uses a network of multitracking devices and a data link between the platform and the line, a rate of change in the angle. U.S. Pat. Appl. No. 20070127012 is hereby incorporated by reference into the specification of the present invention.

U.S. Pat. Appl. No. 20070129085, entitled "SYSTEM AND METHOD OF OPERATION FOR NETWORK OVERLAY GEOLOCATION SYSTEM WITH REPEATERS," discloses a device for and method of geolocation that determines if a signal is received directly or was passed through a repeater. U.S. Pat. Appl. No. 20070129085 is hereby incorporated by reference into the specification of the present invention.

U.S. Pat. Appl. No. 20070146203, entitled "METHOD AND APPARATUS FOR REDUCING GEOLOCATION AMBIGUITY IN SIGNAL TRACKING," discloses a device for and method of geolocation that determines a first and second set of geolocations and comparing the sets to reduce ambiguity. U.S. Pat. Appl. No. 20070146203 is hereby incorporated by reference into the specification of the present invention.

U.S. Pat. Appl. No. 20070236389, entitled "REFERENCE BEACON METHODS AND APPARATUS FOR TDOA/FDOA GEOLOCATION," discloses a device for and method of geolocation that estimates bias errors in TDOA and frequency-difference-of-arrival (FDOA). U.S. Pat. Appl. No. 20070236389 is hereby incorporated by reference into the specification of the present invention.

U.S. Pat. Appl. No. 20080151231, entitled "FIBER OPTIC TESTING SYSTEMS AND METHOD INCORPORATING GEOLOCATION INFORMATION," discloses a device for and method of geolocation that gathers location data pertaining to a fiber optic network. U.S. Pat. Appl. No. 20080151231 is hereby incorporated by reference into the specification of the present invention.

U.S. Pat. Appl. No. 20080169978, entitled "DETECTION OF DECEPTION SIGNAL USED TO DECEIVE GEOLOCATION RECEIVER OF A SATELLITE NAVIGATION SYSTEM," discloses a method of geolocation that detects the presence of a deception signal. U.S. Pat. Appl. No. 20080169978 is hereby incorporated by reference into the specification of the present invention.

U.S. Pat. Appl. No. 20080174490, entitled "STRUCTURED ARRAY GEOLOCATION," discloses a device for and method of geolocation that computes a calibration factor for geolocations of multiple transmitters. U.S. Pat. Appl. No. 20080174490 is hereby incorporated by reference into the specification of the present invention.

U.S. Pat. Appl. No. 20080186235, entitled "MULTIPLATFORM TDOA CORRELATION INTERFEROMETER GEOLOCATION," discloses a device for and method of geolocation where a plurality of samples are taken periodically, the samples are digitized, and Global Positioning System (GPS) stamps are added to the digitized samples. U.S. Pat. Appl. No. 20080186235 is hereby incorporated by reference into the specification of the present invention.

U.S. Pat. Appl. No. 20080252516, entitled "DETERMINING A GEOLOCATION SOLUTION OF AN EMITTER ON EARTH USING SATELLITE SIGNALS," discloses a device for and method of geolocation that takes two TDOA measurements and an FDOA measurement. U.S. Pat. Appl. No. 20080252516 is hereby incorporated by reference into the specification of the present invention.

U.S. Pat. Appl. No. 20080252525, entitled "DETERMINING A GEOLOCATION SOLUTION OF AN EMITTER ON EARTH BASED ON WEIGHTED LEAST-SQUARES ESTIMATION," discloses a device for and method of geolocation that uses least-squares estimation. U.S. Pat. Appl. No. 20080252525 is hereby incorporated by reference into the specification of the present invention.

SUMMARY OF THE INVENTION

It is an object of the present invention to geolocate using complex-valued signals.

It is another object of the present invention to geolocate complex valued-signals with more precision.

It is another object of the present invention to geolocate using real-valued signals in order to stay within the mathematical precision constraints of a computing device on which the signal is processed.

The present invention is a device for and method of geolocation.

The present invention includes a first transmitter for transmitting a signal that will allow it to be geolocated.

The present invention includes a first receiver for receiving the signal transmitted by the first transmitter.

The present invention includes a second receiver for receiving the signal transmitted by the first transmitter.

The present invention includes a first digitizer on the first receiver for digitizing the signal transmitted by the first transmitter.

The present invention includes a second digitizer on the second receiver for digitizing the signal transmitted by the first transmitter.

The present invention includes a first converter on the first receiver for converting the signal digitized by the first digitizer to a complex-valued signal.

The present invention includes a second converter on the second receiver for converting the signal digitized by the second digitizer to a complex-valued signal.

The present invention includes a second transmitter on the first receiver for transmitting the complex-valued signal it created and the first receiver's location and velocity.

The present invention includes a third transmitter on the second receiver for transmitting the complex-valued signal it created and the second receiver's location and velocity.

The present invention includes a processor for receiving the transmissions from the second and third transmitters.

The present invention includes a central processing unit on the processor for determining a difference in radial velocity between the first receiver and the second receiver, a delay time between the times that the signal transmitted by the first transmitter was received by the first receiver and the second receiver, and the location of the first transmitter.

DETAILED DESCRIPTION

The present invention is a device for and method of geolocating a transmitter. The present device and method improve upon Dr. Stein's method by disclosing a device for and method of processing wide-band signals. The present device and method improve upon the method of Chan et al. by disclosing a device for and method of processing large-length, wide-band signals without losing precision and processing complex-valued signals. Chan et al. does not process complex-valued signals and is constrained by the length of the data.

Figure 1:
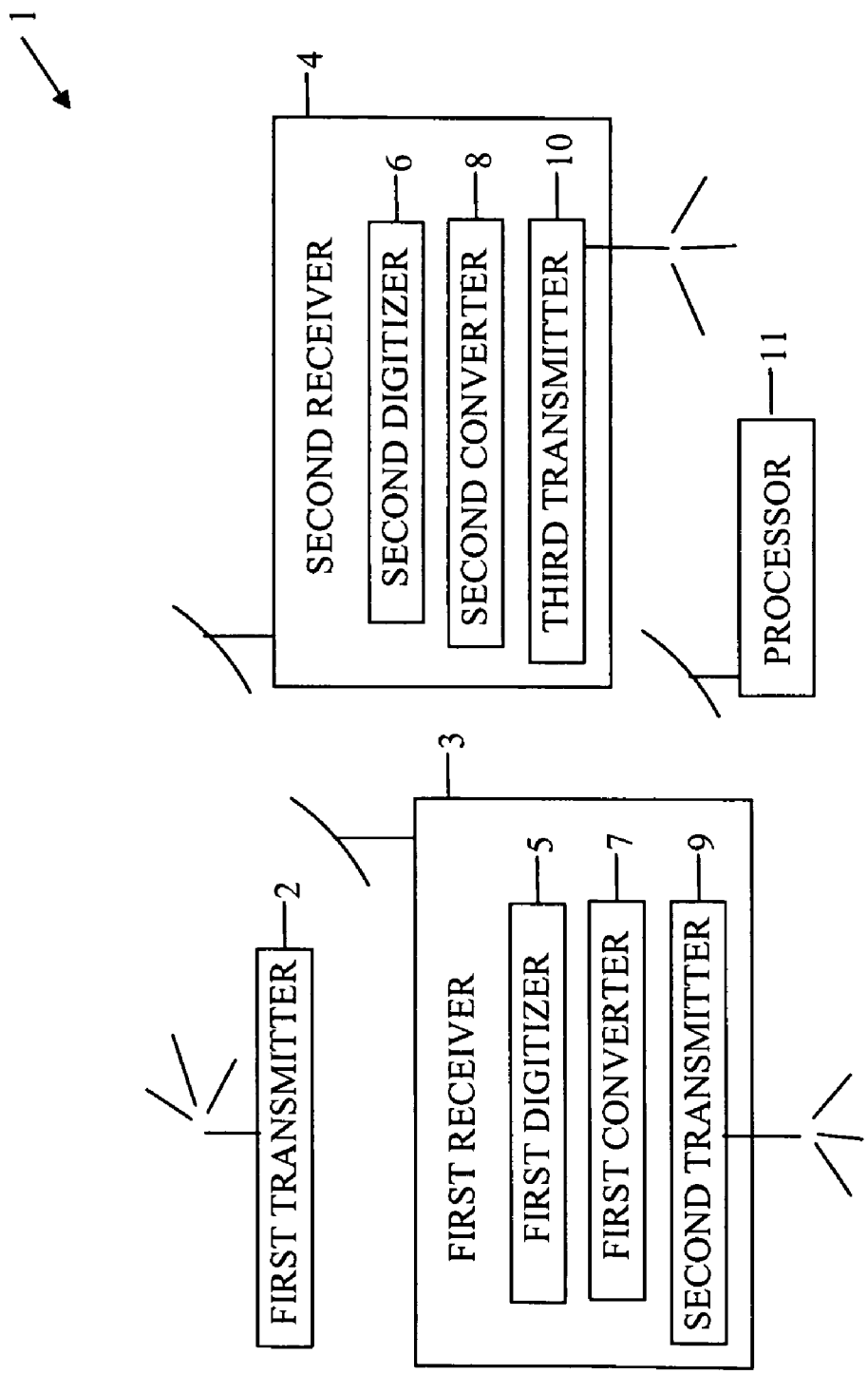
FIG. 1 is a schematic of the device of the present invention.

FIG. 1 is a schematic of the device 1 of the present invention.

The device 1 includes a first transmitter 2. The first transmitter 2 is geolocated by the present method. The first transmitter 2 transmits a signal that is used to geolocate the first transmitter 2. In the preferred embodiment, the signal transmitted by the first transmitter 1 is a real-valued signal.

The device 1 includes a first receiver 3. The first receiver 3, starting at a time T, receives a signal transmitted by the first transmitter 2. In the preferred embodiment, the first receiver 3 is in motion.

The device 1 includes a second receiver 4. The second receiver 4, at time T plus a delay time expressed in samples by $\gamma_0$, receives the signal transmitted by the first transmitter 2. In the preferred embodiment, the second receiver 4 is in motion.

The device 1 includes a first digitizer 5 on the first receiver 3. The first digitizer 5 digitizes the signal received by the first receiver 3. The digitized signal is represented as $x[n]$. The length of the digitized signal is user-definable and is based on the number of samples used to digitize the signal.

The device 1 includes a second digitizer 6 on the second receiver 4. The second digitizer 6 digitizes the signal received by the second receiver 4. The digitized signal is represented as $y[k]$. The length of the digitized signal is user-definable and is based on the number of samples used to digitize the signal.

The device 1 includes a first converter 7 on the first receiver 3. The first converter 7 converts the signal digitized by the first digitizer 5 to a complex-valued signal $x[n]$. In the preferred embodiment, the first converter 7 is a Hilbert Transformer.

The device 1 includes a second converter 8 on the second receiver 4. The second converter 8 converts the signal digitized by the second digitizer 6 to a complex-valued signal $y[k]$. In the preferred embodiment, the second converter 8 is a Hilbert Transformer.

The device 1 includes a second transmitter 9 on the first receiver 3. The second transmitter 9 transmits $x[n]$ and the location $(x_1, y_1, z_1)$ and the velocity $(v_{x1}, v_{y1}, v_{z1})$ of the first receiver 3 at time T when the first receiver 3 started receiving the signal transmitted by the first transmitter 2.

The device 1 includes a third transmitter 10 on the second receiver 4. The third transmitter 10 transmits $y[k]$ and the location $(x_2, y_2, z_2)$ and the velocity $(v_{x2}, v_{y2}, v_{z2})$ of the second receiver 4 at the time the second receiver 3 started receiving the signal transmitted by the first transmitter 2.

The device 1 includes a processor 11. The processor 11 receives the transmissions from the second transmitter 9 and the third transmitter 10. In the preferred embodiment, the processor 11 is separate from the first receiver 3 and the second receiver 4. However, in an alternate embodiment, the processor 11 is on either the first receiver 3 or the second receiver 4.

The device 1 includes a central processing unit 12 on the processor 11. The central processing unit 12 determines a difference in radial velocities $v_0$ of the first receiver 3 and the second receiver 4 relative to the first transmitter 2 at the times when the signal transmitted by the first transmitter 2 started to be received by the first receiver 3 and the second receiver 4. The central processing unit 12 also determines a delay time expressed in samples by $y_0$ that represents a difference between the times that the signal transmitted by the first transmitter 2 started to be received by the first receiver 3 and the second receiver 4. The central processing unit 12 also determines the location of the first transmitter 2 $(x_0, y_0, z_0)$ by solving the following three equations for $(x_0, y_0, z_0)$:

$$\gamma_0 = \left( \sqrt{(x_2-x_0)^2 + (y_2-y_0)^2 + (z_2-z_0)^2} - \sqrt{(x_1-x_0)^2 + (y_1-y_0)^2 + (z_1-z_0)^2} \right) / (c\Delta);$$

$$v_0 = ((x_2-x_0)v_{x2} + (y_2-y_0)v_{y2} + (z_2-z_0)v_{z2}) / \left( \sqrt{(x_2-x_0)^2 + (y_2-y_0)^2 + (z_2-z_0)^2} \right) - ((x_1-x_0)v_{x1} + (y_1-y_0)v_{y1} + (z_1-z_0)v_{z1}) / \left( \sqrt{(x_1-x_0)^2 + (y_1-y_0)^2 + (z_1-z_0)^2} \right);$$

$$r = \sqrt{x_0^2 + y_0^2 + z_0^2},$$

where $\Delta$ is a sampling interval, where c is the speed of light, $(x_2, y_2, z_2)$ is the position of the second receiver 4 at the time that the signal transmitted by the first transmitter 2 started to be received by the second receiver 4, where $(v_{x2}, v_{y2}, v_{z2})$ is the velocity of the second receiver 4 at the time that the signal transmitted by the first transmitter 2 started to be received by the second receiver 4, and where r is the radius of the Earth. The value r may be the average radius of the Earth or it could be the radius of the Earth at an estimated location of the first transmitter 1. For example, if the first transmitter 2 was presumed to be in Rhode Island then the radius of the Earth for Rhode Island would be used for r. In the preferred embodiment, the central processing unit 12 maximizes the following equation and returns the solution as $v_0$ and $y_0$:

$$G(v, \gamma) = \mathrm{Re}\left[ \sqrt{1/(1-(v/c))} \sum_{n=0}^{N-1} x^*(n) \left( \sum_{k=0}^{N-1} y(k) SINC((1/(1-(v/c)))n + \gamma - k) \right) \right],$$

where Re is a function for finding a real value of a complex number, x*[n] is the complex conjugate of x[n], N is the number of data samples in the digitized signal, and SINC is the cardinal sin function. The preferred embodiment can process complex signals and avoids precisions problems associated with the prior art. In an alternate embodiment, the central processing unit 12 maximizes the following equation and returns the solution as $\alpha_0$ and $\gamma_0$, where is $\alpha_0 = 1 - v_0/c$:

$$G(\alpha, \gamma) \text{Re}\left[\sqrt{1/\alpha} \sum_{n=0}^{N-1} x^*[n]\left(\sum_{k=0}^{N-1} y[k]SINC((1/\alpha)n + \gamma - k)\right)\right],$$

where Re is a function for finding a real value of a complex number, x*[n] is the complex conjugate of x[n], N is the number of data samples in the digitized signal in step (d), and SINC is the cardinal sin function. The alternate embodiment can process complex signals. In the preferred embodiment, the central processing unit 12 maximizes the preferred and alternate equations using Newton's Method.

Figure 2:
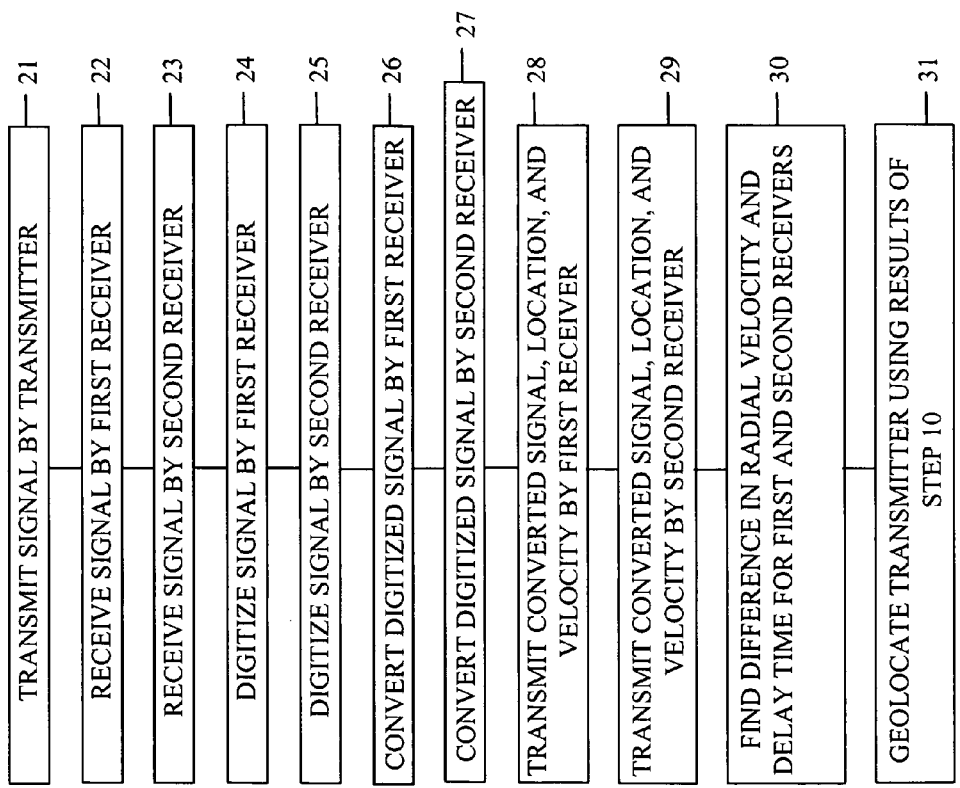
FIG. 2 is a flowchart of the method of the present invention.

FIG. 2 is a flowchart of the method of the present invention. The present invention is a method of geolocation.

The first step 21 of the method is transmitting a signal by a transmitter to be geolocated.

The second step 22 of the method is receiving the signal transmitted in the first step 21 by a first receiver. In the preferred embodiment, the first receiver is in motion.

The third step 23 of the method is receiving the signal transmitted in the first step 21 by a second receiver. In the preferred embodiment, the second receiver is in motion.

The fourth step 24 of the method is digitizing by the first receiver the signal received in the second step 22.

The fifth step 25 of the method is digitizing by the second receiver the signal received in the third step 23.

The sixth step 26 of the method is converting by the first receiver the result of the fourth step 24 to a complex-valued signal x[n]. In the preferred embodiment, a Hilbert Transformation is used to convert the result of the fourth step 24.

The seventh step 27 of the method is converting by the second receiver the result of the fifth step 25 to a complex-valued signal y[k]. In the preferred embodiment, a Hilbert Transformation is used to convert the result of the fifth step 25.

The eighth step 28 of the method is transmitting by the first receiver to a processor x[n], a location $(x_1, y_1, z_1)$ of the first receiver, and a velocity $(v_{x1}, v_{y1}, v_{z1})$ of the first receiver at the time that the first receiver started to receive the signal transmitted in the first step 21. In the preferred embodiment, the processor is a third receiver. In an alternate embodiment, the processor is either the first receiver or the second receiver.

The ninth step 29 of the method is transmitting by the second receiver to the processor y[k], a location and a velocity of the second receiver at the time that the second receiver starts receiving the signal transmitted in the first step 21. In the preferred embodiment, the processor is a third receiver. In an alternate embodiment, the processor is either the first receiver or the second receiver.

The tenth step 30 of the method is determining in the processor a difference in radial velocities $v_0$ of the first receiver and the second receiver relative to the first transmitter at the times when the signal transmitted in the first step 21 started to be received by the first receiver and the second receiver and a delay time expressed in samples by $y_0$ that represents a difference between the times that the signal transmitted in the first step 21 started to be received by the first receiver and the second receiver. In the preferred embodiment, $v_0$ and $y_0$ are determined by maximizing the following equation and returning the solution as $v_0$ and $y_0$:

$$G(v, \gamma) = \text{Re}\left[\sqrt{1/(1-(v/c))} \sum_{n=0}^{N-1} x^*(n)\left(\sum_{k=0}^{N-1} y(k)SINC((1/(1-(v/c)))n + \gamma - k)\right)\right],$$

where Re is a function for finding a real value of a complex number, x*[n] is the complex conjugate of x[n], N is the number of data samples in the digitized signal in step (d), and SINC is the sin cardinal function. The preferred embodiment can process complex signals and avoids precision problems associated with the prior art. In an alternate embodiment, $\alpha_0$ and $\gamma_0$ are determined by maximizing the following equation and returning the solution as $\alpha_0$ and $\gamma_0$, where is $\alpha_0 = 1 - v_0/c$:

$$G(\alpha, \gamma) \text{Re}\left[\sqrt{1/\alpha} \sum_{n=0}^{N-1} x^*[n]\left(\sum_{k=0}^{N-1} y[k]SINC((1/\alpha)n + \gamma - k)\right)\right],$$

where Re is a function for finding a real value of a complex number, x*[n] is the complex conjugate of x[n], N is the number of data samples in the digitized signal in step (d), and SINC is the sin cardinal function. The alternative embodiment can process complex signals. In the preferred and alternate embodiments, the equations are maximized using Newton's Method.

The eleventh step 31 of the method is determining the location of the transmitter $(x_0, y_0, z_0)$ to be geolocated by solving the following three equations for $(x_0, y_0, z_0)$:

$$\gamma_0 = \left(\sqrt{(x_2 - x_0)^2 + (y_2 - y_0)^2 + (z_2 - z_0)^2} - \sqrt{(x_1 - x_0)^2 + (y_1 - y_0)^2 + (z_1 - z_0)^2}\right)/(c\Delta);$$

$$v_0 = ((x_2 - x_0)v_{x2} + (y_2 - y_0)v_{y2} + (z_2 - z_0)v_{z2})/\left(\sqrt{(x_2 - x_0)^2 + (y_2 - y_0)^2 + (z_2 - z_0)^2}\right) - ((x_1 - x_0)v_{x1} + (y_1 - y_0)v_{y1} + (z_1 - z_0)v_{z1})/\left(\sqrt{(x_1 - x_0)^2 + (y_1 - y_0)^2 + (z_1 - z_0)^2}\right);$$

$$r = \sqrt{x_0^2 + y_0^2 + z_0^2},$$

where c is the speed of light, $(x_2, y_2, z_2)$ is the position of the second receiver at the time that the signal transmitted in the first step 21 started to be received by the second receiver, where $(v_{x2}, v_{y2}, v_{z2})$ is the velocity of the second receiver at the time that the signal transmitted in the first step 21 started to be received by the second receiver, and where r is the radius of the Earth.

What is claimed is:
1. A device for geolocation, comprising:
 a) a first transmitter to be geolocated;
 b) a first receiver for receiving a signal transmitted by the transmitter, where the first receiver is in motion;

c) a second receiver for receiving the signal transmitted by the transmitter, where the second receiver is in motion;

d) a first digitizer on said first receiver for digitizing the signal received by the first receiver;

e) a second digitizer on the second receiver for digitizing the signal received by the second receiver;

f) a first converter on the first receiver for converting the signal digitized in step (d) to a complex-valued signal x[n];

g) a second converter on the second receiver for converting the signal digitized in step (e) to a complex-valued signal y[k];

h) a second transmitter on said first receiver for transmitting x[n], a location $(x_1, y_1, z_1)$ and a velocity $(v_{x1}, v_{y1}, v_{z1})$ of the first receiver at the time that the first receiver started to receive the signal transmitted by the first transmitter;

i) a third transmitter on said second receiver for transmitting y[k], a location $(x_2, y_2, z_2)$ and a velocity $(v_{x2}, v_{y2}, v_{z2})$ of the second receiver at the time that the second receiver started receiving the signal transmitted by the first transmitter;

j) a processor for receiving transmissions from the second transmitter and the third transmitter; and k) a central processing unit on said processor for determining a difference in radial velocities $v_0$ of the first receiver and the second receiver relative to the first transmitter at times when the signal transmitted by the first transmitter started to be received by the first receiver and the second receiver and a delay time expressed in samples by $y_0$ that represents a difference between the times that the signal transmitted by the first transmitter started to be received by the first receiver and the second receiver and for determining the location of the first transmitter $(x_0, y_0, z_0)$ by solving the following three equations for $(x_0, y_0, z_0)$:

$$\gamma_0 = \left(\sqrt{(x_2-x_0)^2+(y_2-y_0)^2+(z_2-z_0)^2} - \sqrt{(x_1-x_0)^2+(y_1-y_0)^2+(z_1-z_0)^2}\right)/(c\Delta);$$

$$v_0 = ((x_2-x_0)v_{x2}+(y_2-y_0)v_{y2}+(z_2-z_0)v_{z2})/\left(\sqrt{(x_2-x_0)^2+(y_2-y_0)^2+(z_2-z_0)^2}\right) - ((x_1-x_0)v_{x1}+(y_1-y_0)v_{y1}+(z_1-z_0)v_{z1})/\left(\sqrt{(x_1-x_0)^2+(y_1-y_0)^2+(z_1-z_0)^2}\right);$$

$$r=\sqrt{x_0^2+y_0^2+z_0^2},$$

where $\Delta$ is a sampling interval, c is a speed of light, $(x_2, y_2, z_2)$ is a position of the second receiver at the time that the signal transmitted by the first transmitter started to be received by the second receiver, $(v_{x2}, v_{y2}, v_{z2})$ is a velocity of the second receiver at the time that the signal transmitted by the first transmitter started to be received by the second receiver, and r is a radius of the Earth.

2. The device of claim 1, wherein said first converter is a Hilbert transformer.

3. The device of claim 1, wherein said second converter is a Hilbert transformer.

4. The device of claim 1, wherein said processor is located at a location selected from the group of locations consisting of the first receiver, the second receiver, and a third receiver.

5. The device of claim 1, wherein said central processing unit in said processor maximizes the following equation and returns the solution as $v_0$ and $\gamma_0$:

$$G(v, \gamma) = \mathrm{Re}\left[\sqrt{1/(1-(v/c))}\sum_{n=0}^{N-1} x^*(n)\left(\sum_{k=0}^{N-1} y(k)SINC((1/(1-(v/c)))n+\gamma-k)\right)\right],$$

where Re is a function for finding a real value of a complex number, $x^*[n]$ is a complex conjugate of x[n], N is a number of data samples in the digitized signal, and SINC is a cardinal sin function.

6. The device of claim 1, wherein said central processing unit in said processor maximizes the following equation and returns the solution as $\alpha_0$ and $\gamma_0$, where $\alpha_0 = 1 - v_0/c$:

$$G(\alpha, \gamma)\mathrm{Re}\left[\sqrt{1/\alpha}\sum_{n=0}^{N-1} x^*[n]\left(\sum_{k=0}^{N-1} y[k]SINC((1/\alpha)n-\gamma-k)\right)\right],$$

where Re is a function for finding a real value of a complex number, $x^*[n]$ is a complex conjugate of x[n], N is a number of data samples in the digitized signal in step (d), and SINC is a cardinal sin function.

7. The device of claim 5, wherein said central processing unit in said processor maximizes the equation and returns the solution as $v_0$ and $\gamma_0$ using Newton's Method.

8. The device of claim 6, wherein said central processing unit in said processor maximizes the equation and returns the solution as $\alpha_0$ and $\gamma_0$ using Newton's Method.

9. A device for geolocation, comprising:

a) a first transmitter to be geolocated;

b) a first receiver for receiving a signal transmitted by the transmitter, where the first receiver is in motion;

c) a second receiver for receiving the signal transmitted by the transmitter, where the second receiver is in motion;

d) a first digitizer on said first receiver for digitizing the signal received by the first receiver as x[n];

e) a second digitizer on the second receiver for digitizing the signal received by the second receiver as y[k];

f) a second transmitter on said first receiver for transmitting x[n], a location $(x_1, y_1, z_1)$ and a velocity $(v_{x1}, v_{y1}, v_{z1})$ of the first receiver at the time that the first receiver started to receive the signal transmitted by the first transmitter;

g) a third transmitter on said second receiver for transmitting y[k], a location $(x_2, y_2, z_2)$ and a velocity $(v_{x2}, v_{y2}, v_{z2})$ of the second receiver at the time that the second receiver started receiving the signal transmitted by the first transmitter;

h) a processor for receiving transmissions from the second transmitter and the third transmitter; and i) a central processing unit on said processor for determining a difference in radial velocities $v_0$ of the first receiver and the second receiver relative to the first transmitter at times when the signal transmitted by the first transmitter started to be received by the first receiver and the second receiver and a delay time expressed in samples by $\gamma_0$ that represents a difference between the times that the signal transmitted by the first transmitter started to be received by the first receiver and the second receiver, where the central processor maximizes the following equation and returns $v_0$ and $\gamma_0$:

$$G(v, \gamma) = \text{Re}\left[\sqrt{1/(1-(v/c))} \sum_{n=0}^{N-1} x^*(n)\left(\sum_{k=0}^{N-1} y(k) SINC((1/(1-(v/c)))n + \gamma - k)\right)\right],$$

where Re is a function for finding a real value of a complex number, $x^*[n]$ is a complex conjugate of $x[n]$, N is a number of data samples in the digitized signal, and SINC is a cardinal sin function, and for determining the location of the first transmitter $(x_0, y_0, z_0)$ by solving the following three equations for $(x_0, y_0, z_0)$:

$$\gamma_0 = \left(\sqrt{(x_2-x_0)^2 + (y_2-y_0)^2 + (z_2-z_0)^2} - \sqrt{(x_1-x_0)^2 + (y_1-y_0)^2 + (z_1-z_0)^2}\right)/(c\Delta);$$

$$v_0 = ((x_2-x_0)v_{x2} + (y_2-y_0)v_{y2} + (z_2-z_0)v_{z2})/\left(\sqrt{(x_2-x_0)^2 + (y_2-y_0)^2 + (z_2-z_0)^2}\right) - ((x_1-x_0)v_{x1} + (y_1-y_0)v_{y1} + (z_1-z_0)v_{z1})/\left(\sqrt{(x_1-x_0)^2 + (y_1-y_0)^2 + (z_1-z_0)^2}\right);$$

$$r = \sqrt{x_0^2 + y_0^2 + z_0^2},$$

where $\Delta$ is a sampling interval, c is a speed of light, where $(x_2, y_2, z_2)$ is a position of the second receiver at the time that the signal transmitted by the first transmitter started to be received by the second receiver, $(v_{x2}, v_{y2}, v_{z2})$ is a velocity of the second receiver at the time that the signal transmitted by the first transmitter started to be received by the second receiver, and r is a radius of the Earth.

10. A method of geolocation, comprising the steps of
a) transmitting a signal by a transmitter to be geolocated;
b) receiving the signal transmitted in step (a) by a first receiver, where the first receiver is in motion;
c) receiving the signal transmitted in step (a) by a second receiver, where the second receiver is in motion;
d) digitizing by the first receiver the signal received in step (b);
e) digitizing by the second receiver the signal received in step (c);
f) converting by the first receiver the result of step (d) to a complex-valued signal $x[n]$;
g) converting by the second receiver the result of step (e) to a complex-valued signal $y[k]$;
h) transmitting by the first receiver to a processor $x[n]$, a location $(x_1, y_1, z_1)$ and a velocity $(v_{x1}, v_{y1}, v_{z1})$ of the first receiver at the time that the first receiver started receiving the signal transmitted in step (a);
i) transmitting by the second receiver to the processor $y[k]$, a location $(x_2, y_2, z_2)$ and a velocity $(v_{x2}, v_{y2}, v_{z2})$ of the second receiver at the time that the second receiver started receiving the signal transmitted in step (a);
j) determining in the processor a difference in radial velocity $v_0$ of the first receiver and the second receiver relative to the first transmitter at times when the signal transmitted in step (a) started to be received by the first receiver and the second receiver and a delay time expressed in samples as $\gamma_0$ that represents a difference between the times that the signal transmitted in step (a) was received by the first receiver and the second receiver; and
k) determining the location of the transmitter $(x_0, y_0, z_0)$ to be geolocated by solving the following three equations for $(x_0, y_0, z_0)$:

$$\gamma_0 = \left(\sqrt{(x_2-x_0)^2 + (y_2-y_0)^2 + (z_2-z_0)^2} - \sqrt{(x_1-x_0)^2 + (y_1-y_0)^2 + (z_1-z_0)^2}\right)/(c\Delta);$$

$$v_0 = ((x_2-x_0)v_{x2} + (y_2-y_0)v_{y2} + (z_2-z_0)v_{z2})/\left(\sqrt{(x_2-x_0)^2 + (y_2-y_0)^2 + (z_2-z_0)^2}\right) - ((x_1-x_0)v_{x1} + (y_1-y_0)v_{y1} + (z_1-z_0)v_{z1})/\left(\sqrt{(x_1-x_0)^2 + (y_1-y_0)^2 + (z_1-z_0)^2}\right);$$

$$r = \sqrt{x_0^2 + y_0^2 + z_0^2},$$

where $\Delta$ is a sampling interval, c is a speed of light, where $(x_2, y_2, z_2)$ is a position of the second receiver at the time that the signal transmitted in step (a) started to be received by the second receiver, $(v_{x2}, v_{y2}, v_{z2})$ is a velocity of the second receiver at the time that the signal transmitted in step (a) started to be received by the second receiver, and r is a radius of the Earth.

11. The method of claim 10, wherein said step of converting by the first receiver the result of step (d) to a complex-valued signal $x[n]$ is comprised of the step of converting by the first receiver the result of step (d) to a complex-valued signal $x[n]$ using a Hilbert transformation.

12. The method of claim 10, wherein said step of converting by the second receiver the result of step (e) to a complex-valued signal $y[k]$ is comprised of the step of converting by the second receiver the result of step (e) to a complex-valued signal $y[k]$ using a Hilbert transformation.

13. The method of claim 10, wherein said step of transmitting by the first receiver to a processor $x[n]$, a location $(x_1, y_1, z_1)$ and a velocity $(v_{x1}, v_{y1}, v_{z1})$ of the first receiver at the time that the first receiver started to receive the signal transmitted in step (a) is comprised of the step of transmitting to a processor $x[n]$, a location $(x_1, y_1, z_1)$ and a velocity $(v_{x1}, v_{y1}, v_{z1})$ of the first receiver at the time that the first receiver started to receive the signal transmitted in step (a) where the processor is located at a location selected from the group of locations consisting of the first receiver, the second receiver, and a third receiver.

14. The method of claim 10, wherein said step of transmitting by the second receiver to a processor $y[k]$, a location $(x_2, y_2, z_2)$ and a velocity $(v_{x2}, v_{y2}, v_{z2})$ of the second receiver at the time that the second receiver started receiving the signal transmitted in step (a) is comprised of the step of transmitting to a processor $y[k]$, a location $(x_2, y_2, z_2)$ and a velocity $(v_{x2}, v_{y2}, v_{z2})$ of the second receiver at the time that the second receiver started receiving the signal transmitted in step (a) where the processor is located at a location selected from the group of locations consisting of the first receiver, the second receiver, and a third receiver.

15. The method of claim 10, wherein said step of determining in the processor a difference in radial velocities $v_0$ of the first receiver and the second receiver relative to the first transmitter at times when the signal transmitted in step (a) was received by the first receiver and the second receiver and a delay time expressed in samples by $\gamma_0$ in that represents a difference between the times that the signal transmitted in step (a) started to be received by the first receiver and the second receiver is comprised of maximizing the following equation and returning the solution as $v_0$ and $\gamma_0$:

$$G(v, \gamma) = \mathrm{Re}\left[\sqrt{1/(1-(v/c))} \sum_{n=0}^{N-1} x^*(n)\left(\sum_{k=0}^{N-1} y(k) SINC((1/(1-(v/c)))n+\gamma-k)\right)\right],$$

where Re is a function for finding a real value of a complex number, $x^*[n]$ is a complex conjugate of $x[n]$, N is a number of data samples in the digitized signal in step (d), and SINC is a cardinal sin function.

16. The method of claim 10, wherein said step of determining in the processor a difference in radial velocities $v_0$ of the first receiver and the second receiver relative to the first transmitter at times when the signal transmitted in step (a) started to be received by the first receiver and the second receiver and a delay time expressed in samples by $\gamma_0$ that represents a difference between the times that the signal transmitted in step (a) started to be received by the first receiver and the second receiver is comprised of maximizing the following equation and returning the solution as $\alpha_0$ and $\gamma_0$, where $\alpha_0 = 1 - v_0/C$:

$$G(\alpha, \gamma) \mathrm{Re}\left[\sqrt{1/\alpha} \sum_{n=0}^{N-1} x^*[n]\left(\sum_{k=0}^{N-1} y[k] SINC((1/\alpha)n+\gamma-k)\right)\right],$$

where Re is a function for finding a real value from a complex number, $x^*[n]$ is a complex conjugate of $x[n]$, N is a number of data samples in the digitized signal in step (d), and SINC is a cardinal sin function.

17. The method of claim 15, wherein said step of maximizing the equation and returning the solution as $v_0$ and $\gamma_0$ is comprised of maximizing the equation and returning the solution as $v_0$ and $\gamma_0$ using Newton's Method.

18. The method of claim 16, wherein said step of maximizing the equation and returning the solution as $\alpha_0$ and $\gamma_0$ is comprised of maximizing the equation and returning the solution as $\alpha_0$ and $\gamma_0$ using Newton's Method.

19. A method of geolocating, comprising the steps of
   a) transmitting a signal by a transmitter to be geolocated;
   b) receiving the signal transmitted in step (a) by a first receiver, where the first receiver is in motion;
   c) receiving the signal transmitted in step (a) by a second receiver, where the second receiver is in motion;
   d) digitizing by the first receiver the signal received in step (b) as $x[n]$;
   e) digitizing by the second receiver the signal received in step (c) as $y[k]$;
   f) transmitting by the first receiver to a processor $x[n]$, a location $(x_1, y_1, z_1)$ of the first receiver, and a velocity $(v_{x1}, v_{y1}, v_{z1})$ of the first receiver at the time that the first receiver started to receive the signal transmitted in step (a);
   g) transmitting by the second receiver to the processor $y[k]$ a location $(x_2, x_2, z_2)$ and a velocity $(v_{x2}, v_{y2}, v_{z2})$ of the second receiver at the time that the second receiver started receiving the signal transmitted in step (a);
   h) determining in the processor a difference in radial velocities $v_0$ of the first receiver and the second receiver relative to the first transmitter at times when the signal transmitted in step (a) started to be received by the first receiver and the second receiver and a delay time expressed in samples by $\gamma_0$ that represents a difference between the times that the signal transmitted in step (a) started to be received by the first receiver and the second receiver by maximizing the following equation and returning the solution as $v_0$ and $\gamma_0$:

$$G(v, \gamma) = \mathrm{Re}\left[\sqrt{1/(1-(v/c))} \sum_{n=0}^{N-1} x^*(n)\left(\sum_{k=0}^{N-1} y(k) SINC((1/(1-(v/c)))n+\gamma-k)\right)\right],$$

where Re is a function for finding a real value of a complex number, $x^*[n]$ is a complex conjugate of $x[n]$, N is a number of data samples in the digitized signal in step (d), and SINC is a cardinal sin function; and
   i) determining the location of the transmitter $(x_0, y_0, z_0)$ to be geolocated by solving the following three equations for $(x_0, y_0, z_0)$:

$$\gamma_0 = \left(\sqrt{(x_2-x_0)^2+(y_2-y_0)^2+(z_2-z_0)^2} - \sqrt{(x_1-x_0)^2+(y_1-y_0)^2+(z_1-z_0)^2}\right)/(c\Delta);$$

$$v_0 = ((x_2-x_0)v_{x2}+(y_2-y_0)v_{y2}+(z_2-z_0)v_{z2})/\left(\sqrt{(x_2-x_0)^2+(y_2-y_0)^2+(z_2-z_0)^2}\right) - ((x_1-x_0)v_{x1}+(y_1-y_0)v_{y1}+(z_1-z_0)v_{z1})/\left(\sqrt{(x_1-x_0)^2+(y_1-y_0)^2+(z_1-z_0)^2}\right);$$

$$r = \sqrt{x_0^2+y_0^2+z_0^2},$$

where $\Delta$ is a sampling interval, c is a speed of light, $(x_2, y_2, z_2)$ is a position of the second receiver at the time that the signal transmitted in step (a) started to be received by the second receiver, where $(v_{x2}, v_{y2}, v_{z2})$ is the velocity of the second receiver at the time that the signal transmitted in step (a) started to be received by the second receiver, and where r is a radius of the Earth.

* * * * *